(12) United States Patent
Schulz et al.

(10) Patent No.: US 10,981,579 B2
(45) Date of Patent: Apr. 20, 2021

(54) METHOD FOR OPERATING A VEHICLE HAVING A DRIVER ASSISTANCE SYSTEM INTERVENING IN A TRANSVERSE DYNAMICS OF THE VEHICLE

(71) Applicant: Robert Bosch GmbH, Stuttgart (DE)

(72) Inventors: Michael Schulz, Sinsheim (DE); Christian Loeffler, Neckarsulm (DE); Lenne Ahrens, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 226 days.

(21) Appl. No.: 16/242,234

(22) Filed: Jan. 8, 2019

(65) Prior Publication Data

US 2019/0210614 A1    Jul. 11, 2019

(30) Foreign Application Priority Data

Jan. 11, 2018    (DE) .......................... 102018200388.2

(51) Int. Cl.
*B60W 50/08*    (2020.01)
*B60W 50/10*    (2012.01)
(Continued)

(52) U.S. Cl.
CPC .......... *B60W 50/082* (2013.01); *B60W 50/10* (2013.01); *G05D 1/0061* (2013.01);
(Continued)

(58) Field of Classification Search
CPC .............. B60W 50/082; B60W 50/10; B60W 2050/0071; B60W 2050/0073; G05D 1/0061

See application file for complete search history.

(56) References Cited

U.S. PATENT DOCUMENTS 7,894,951 B2 *  2/2011  Norris .................. G05D 1/0061
                                                              701/36
10,800,430 B2 * 10/2020  Movert ............. B60W 50/0097
(Continued)

FOREIGN PATENT DOCUMENTS

DE         102012112442 A1    6/2014

OTHER PUBLICATIONS

English-Machine translation of DE102012112442A1, retrieved on Oct. 14, 2020 from https://translationportal.epo.org/emtp/translate/?ACTION=description-retrieval&Country=DE&ENGINE=google&FORMAT=docdb&KIND=A1&LOCALE=en EP& Number=102012112442&SRCLANG=de&TRGLANG=en (Year: 2020).*

(Continued)

*Primary Examiner* — Calvin Cheung
(74) *Attorney, Agent, or Firm* — Norton Rose Fulbright US LLP; Gerard Messina

(57) ABSTRACT

A method for operating a vehicle having a driver assistance system intervening in a transverse dynamics of the vehicle, comprising the steps:
  detecting a driver intervention in a driving behavior of the vehicle due to an intervention of at least one actuator triggered by the driver assistance system;
  interpreting the driver intervention as an override of the intervention of the actuator; and
  reducing in a defined manner the intervention of the actuator as a function of the interpretation of the driver intervention in such a way that a driving task is returned to the driver in a controlled and defined manner.

8 Claims, 2 Drawing Sheets

(51) Int. Cl.
*G05D 1/00* (2006.01)
*B60W 50/00* (2006.01)
(52) U.S. Cl.
CPC .............. *B60W 2050/0071* (2013.01); *B60W 2050/0073* (2013.01)

(56) References Cited

U.S. PATENT DOCUMENTS

| | | | |
|---|---|---|---|
| 2012/0083947 A1* | 4/2012 | Anderson | G08G 1/165 |
| | | | 701/3 |
| 2015/0006028 A1* | 1/2015 | Strauss | B60W 30/16 |
| | | | 701/36 |
| 2016/0280236 A1* | 9/2016 | Otsuka | B60W 50/082 |
| 2017/0248954 A1* | 8/2017 | Tomatsu | B60W 40/08 |
| 2019/0283769 A1* | 9/2019 | Chiba | G08G 1/16 |

OTHER PUBLICATIONS

Mirnig et. al., "Control Transition Interfaces in Semiautonomous Vehicles: A Categorization Framework and Literature Analysis", published Sep. 2016, retrieved from https://dl.acm.org/doi/pdf/10.1145/3122986.3123014 (Year: 2016).*

Neukum A., Ufer E., "Controllability of superposition steereng system failures", Steereng. Tech, Garcheng 2008,

* cited by examiner

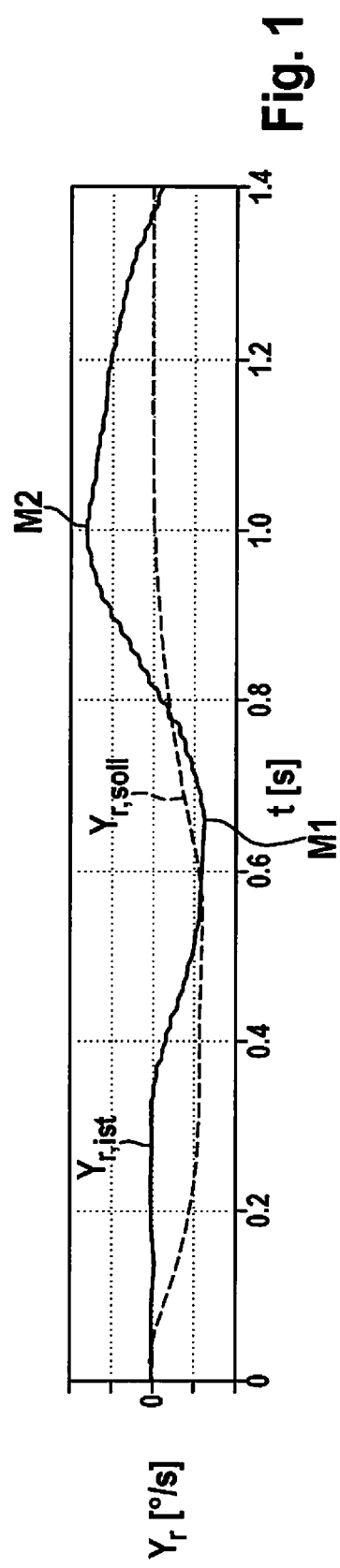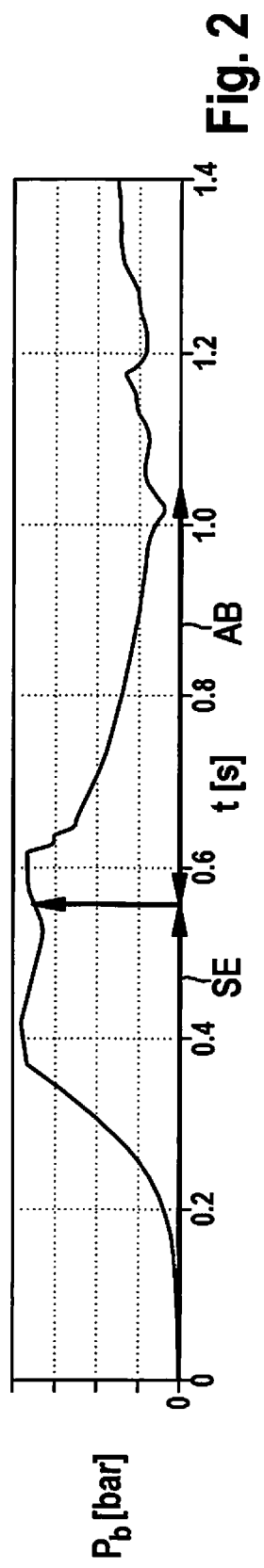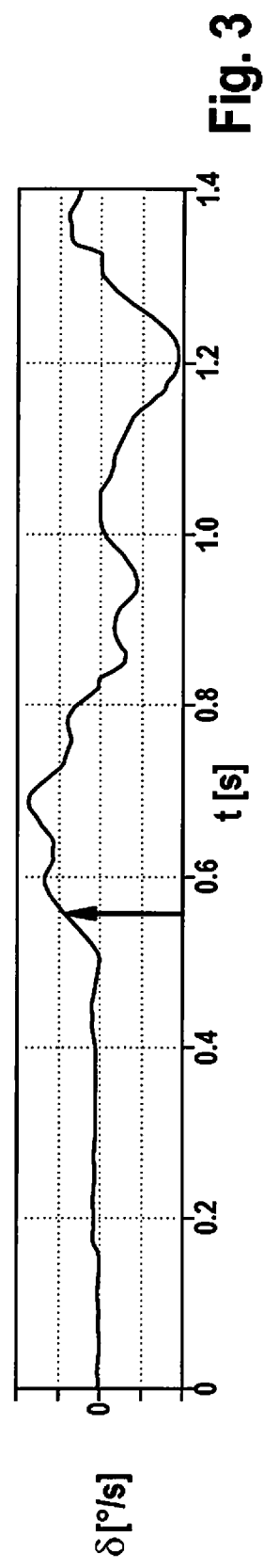

METHOD FOR OPERATING A VEHICLE HAVING A DRIVER ASSISTANCE SYSTEM INTERVENING IN A TRANSVERSE DYNAMICS OF THE VEHICLE

FIELD OF THE INVENTION

The present invention relates to a method for operating a vehicle having a driver assistance system intervening in a transverse dynamics of the vehicle. The present invention further relates to a device for operating a vehicle having a driver assistance system intervening in a transverse dynamics of the vehicle. The present invention further relates to a computer program product.

BACKGROUND INFORMATION

In known driver assistance systems, the maximum intervention intensities of the respective function are based on the controllability criteria of possible actuator errors. This greatly restricts the functional use, it not being possible to address many potential accident scenarios in their entirety.

In 2010, a study was published regarding the controllability of potential false interventions of the electronic stability program (ESP) that is known per se. In the process, globally valid target values were defined for tolerable, non-safety-related brake interventions. The orders of magnitude ascertained in the process of tolerable disturbance yaw rates correspond to the target values worked out for steering system failures (cf. Neukum A., Ufer E., Paulig J., Krüger H.-P., Controllability of superposition steering system failures, steering.tech, Garching 2008). When these actuator-independent disturbance yaw variables are adhered to, a simple and safe controllability may be assumed in the event of a failure.

German Published Patent Application No. 10 2012 112 442 discloses a method for controlling a vehicle having a driver assistance system allowing for automated, partially automated and manual driving. This document discloses that for deactivating at least one assistance function of the driver assistance system by driver operation of a vehicle control element, a detection threshold to be detected by the driver assistance system is lowered with increasing degree of automation.

SUMMARY

It is an objective of the present invention to provide an improved method for operating a vehicle having a driver assistance system intervening in a transverse dynamics of the vehicle.

According to a first aspect, the objective is achieved by a method for operating a vehicle having a driver assistance system intervening in a transverse dynamics of the vehicle, comprising the steps:
  detecting a driver intervention in a driving behavior of the vehicle due to an intervention of at least one actuator triggered by the driver assistance system;
  interpreting the driver intervention as an override of the intervention of the actuator; and
  reducing in a defined manner the intervention of the actuator as a function of the interpretation of the driver intervention in such a way that a driving task is given back to the driver in a controlled and defined manner.

The intervention of the actuator may be due e.g. to a correct function or to a malfunction of the driver assistance system intervening in the transverse dynamics. In the event of a malfunction, the intervention of the actuator may be due e.g. to a flawed interpretation of situations and/or due to false triggers of the driver assistance system intervening in the transverse dynamics. In this manner it is advantageously possible, in spite of a current intervention of an actuator, to transfer the vehicle back into a stable state in combination with the behavior of the driver. Advantageously, this improves an operating characteristic of the vehicle, which advantageously increases a traffic safety of the vehicle. This advantageously makes it possible to implement greater intervention intensities of the actuators because, in the event of a failure, the task of driving is returned to the driver in a controlled manner.

According to a second aspect, the objective is achieved by a method for operating a vehicle having a driver assistance system intervening in a transverse dynamics of the vehicle, comprising:
  a detection device for detecting a driver intervention in a driving behavior of the vehicle due to an intervention of at least one actuator triggered by the driver assistance system;
  an interpretation device for interpreting the driver intervention as an override of the intervention of the actuator; and
  a reduction device for definably reducing the intervention of the actuator as a function of the interpretation of the driver intervention in such a way that a driving task is returned to the driver in a definably controlled manner.

One advantageous development of the method provides for the intervention, triggered by the driver assistance system, of the at least one actuator for influencing the guidance of the vehicle to be a braking intervention and/or a steering intervention and/or an intervention in a drive train of the vehicle. In this manner, it is possible to use the method advantageously for vehicles operated and/or controlled in various ways, for example for a vehicle having front-axle steering, a vehicle having rear-axle steering, a vehicle having superimposition steering as well as for vehicles having the most varied brake systems.

Another advantageous development of the method provides for a time characteristic of the defined reduction of the intervention of the at least one actuator to be designed in accordance with a defined mathematical function. This advantageously allows for a suitable development of the desired reduction or cancellation of the actuator intervention.

Further advantageous developments of the method provide for the detection of the driver intervention to be performed by detecting a reaction of the driver of the vehicle, in particular by detecting a driver activity on the steering wheel of the vehicle, in particular by detecting a steering-wheel angle and/or a steering-wheel angular velocity, a steering torque and/or by detecting an operation of an accelerator pedal of the vehicle and/or by detecting an operation of a brake pedal of the vehicle and/or by detecting facial expressions/gestures of the driver. This advantageously supports different detection concepts, which make it possible reliable to detect an intention of the driver for initiating a countermeasure for the purpose of rectifying an actuator intervention.

Another advantageous development of the method provides for a defined reduction of the intervention of the at least one actuator to be performed on the basis of a predictive mathematical model. This makes it possible to perform the method by using data of the predictive mathematical model in optimized fashion.

The present invention is described below in detail with additional features and advantages with reference to several figures. In this context, all of the described or represented features, alone or in any combination, form the subject matter of the present invention, regardless of their combination in the patent claims or their antecedent reference, and regardless of their formulation or representation in the specification and in the figures. The figures are primarily intended to illustrate the principles that are essential for the present invention.

Disclosed method features result analogously from corresponding disclosed device features and vice versa. This means in particular that features, technical advantages and embodiments relating to the method analogously result from corresponding embodiments, features and advantages of the device and vice versa.

BRIEF DESCRIPTION OF THE DRAWINGS

FIG. 1 a basic representation of a mode of operation of the provided method.

FIG. 2 another basic representation of a mode of operation of the provided method.

FIG. 3 another basic representation of a mode of operation of the provided method.

DETAILED DESCRIPTION

Figure 4:
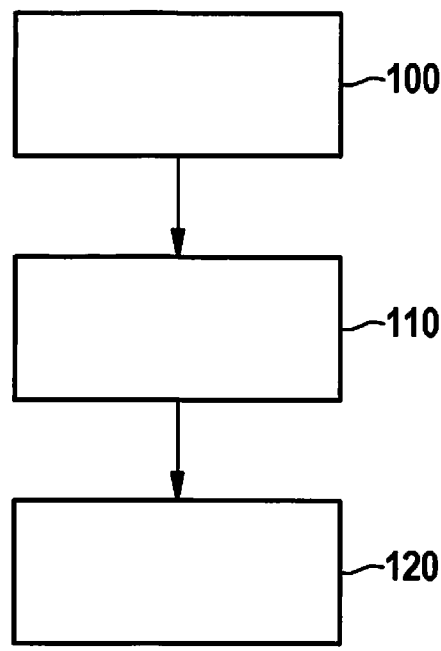
FIG. 4 a basic sequence of a method for operating a vehicle having a driver assistance system intervening in the transverse dynamics.

The term vehicle having a driver assistance system intervening in the transverse dynamics is understood in the following in such a way that the driver assistance system is used for assisting in or performing an evasive maneuver of the vehicle (e.g. in emergency situations, in lane-keeping, etc.). The steering intervention of the driver assistance system may be developed as a braking intervention and/or as a steering intervention and/or as an intervention in a drive train of the vehicle.

The vehicle may be designed as an exclusively manually controlled, as a fully automated, partially automated, fully autonomous or partially autonomous motor vehicle.

A central idea of the present invention is in particular to provide a method and a device in which a driver intervention in response to an intervention of the driver assistance system intervening in a transverse dynamics of the vehicle is detected and utilized in order to return a controllability of the vehicle to the driver in the event of great intervention intensities of the actuator because interpretation has determined that this corresponds to a wish of the driver. Here it is assumed that the vehicle fundamentally has a sensor system for monitoring the activity of the driver.

Conventional assistance systems for vehicle guidance use maximum yaw rate changes of approx. 3°/s at 100 km/h and approx. 5°/s at 50 km/h. These target values were ascertained in the studies mentioned above in the related art. The investigation was based on faulty ESP interventions with maximum brake-pressure request, which were canceled at maximum gradients after a defined latency. In the process it turned out that in particular the cancellation of the fault at maximum gradients resulted in an overshooting value during the driver's compensation attempt and that at higher amplitudes it was rated as critical or as no longer controllable.

The present invention provides for remedying this disadvantage to the greatest possible extent by taking the driver reaction into account in combination with a defined switch-off of the actuator intervention. In particular, the actuator intervention is not canceled at maximum gradients, but is initiated by the driver and reduced in an adapted manner. The adaptation occurs in a model-predictive manner, a predictive mathematical model of the vehicle being created by taking into account the current vehicle and driver state so that in this manner an optimized compensation of the system intervention and a safe state of the vehicle are provided. A withdrawal of the system intervention occurs in accordance with a mathematical function, for example in the form of a linear withdrawal, a suitable transfer function of a controlled system, etc.

The method will be explained in greater detail below with reference to an exemplary scenario classified as controllable.

In the manner explained, it is possible to compensate for braking interventions and/or steering interventions (front-axle steering, rear-axle steering, superimposition steering) of the automated vehicle.

The defined withdrawal of the faulty actuator intervention is preferably designed according to a defined mathematical function, e.g. as a linear characteristic curve or as a response characteristic of a transfer element of control engineering (e.g. PT2 element). It is thus advantageously possible to implement a multitude of differently designed withdrawal functions.

FIG. 1 shows a diagram explaining a mode of operation of the provided method. FIG. 1 shows time characteristics of yaw rates, a measured yaw rate $y_{r,actual}$ and a yaw rate $y_{r,setpoint}$ planned by the system being shown. The figure shows a time characteristic of the yaw rate $y_{r,actual}(t)$ of the vehicle that is generated in the process. A first maximum M1 of the yaw rate $y_{r,actual}(t)$ results from a braking intervention triggered correctly or erroneously by the driver assistance system. A second maximum M2 of the yaw rate $y_{r,actual}(t)$ arises by a superimposition of the actuator intervention with the withdrawal of the actuator intervention attenuated in accordance with the present invention and the effects due to the driver reaction.

In this manner it is advantageously possible for the intervention yaw rate to be considerably higher than the currently applicable limit values (3°/s), which results in an increased functional use of the driver assistance system (e.g., evasion assistant) intervening in the transverse dynamics of the vehicle and controlled by the provided method, because it is possible to implement higher intervention intensities of said driver assistance system.

The utilized withdrawal or switch-off algorithm and a detection and interpretation of the driver reaction required for this purpose may be implemented in various ways. To implement the withdrawal or switch-off algorithm, it is possible for example to perform a defined switch-off or withdrawal of the steering torque and/or a defined withdrawal of a drive torque in the drive train.

Possible methods for detecting the driver reaction may be e.g. a detection of the brake pedal and/or accelerator pedal position and/or the steering wheel angular velocity and/or the steering torque. The detection of the steering wheel angular velocity is preferably performed by a sensor built into the steering wheel of the vehicle.

FIG. 2 shows a time characteristic of a controlled variable of the system in the form of a brake pressure $p_b$ acting on a wheel of the vehicle, whereby an intervention in the transverse dynamics of the vehicle is achieved. In this concrete case, the brake system is used to control the vehicle. A time segment SE is shown, in which the actuator intervention occurs, as well as a switch-off period AB, in which the provided defined withdrawal of the actuator intervention is performed.

Other possibilities of intervening in the movement of the automated vehicle are also conceivable in accordance with the present invention.

For this purpose, the present invention provides for the driver, after a defined time, to counteract the braking intervention initiated correctly or erroneously, by a steering intervention and thereby to exceed a predefined threshold value of the steering wheel angular velocity. As a response to this, the present invention provides for the correctly or erroneously initiated braking intervention to be withdrawn in a defined manner within a parameterizable time period, whereby the brake pressure is definably reduced, whereby the task of driving is returned to the driver in a controlled manner.

FIG. 3 shows a reaction of the driver on the steering wheel of the vehicle, which is expressed by a time characteristic of the steering wheel angular velocity d(t). As mentioned, other detected driver reactions would also be conceivable such as for example changed positions of accelerator pedal and/or brake pedal, whose operations are detected by sensors, monitoring cameras, etc. for detecting a driver intention.

At time t=0 s, the intervention into the transverse dynamics of the vehicle caused by the driver assistance system begins, whereby the vehicle is erroneously braked on one side so that at time t–0.4 s it begins to rotate. After approx. 0.55 s, the driver recognizes the movement of the vehicle and begins to steer counter to the rotation or to counteract the intervention. The present invention provides for the system to detect the driver's wish, to interpret it and thereby to start to abort the system intervention in a defined manner in that it withdraws the system intervention in a defined manner or switches it off slowly. For this purpose, there may be a provision to withdraw the brake pressure in a defined manner so that the driver is able to adjust to the change of the vehicle behavior and so that no overshooting value results in the compensation reaction and that the driver in the end remains in his own lane.

The decisive point is that an intention of the driver to perform a countermeasure or driver reaction in response to the faulty actuator intervention is detected reliably, which is achieved e.g. by sensors and/or a camera directed toward the driver in the interior of the vehicle in order e.g. to detect a facial expression and/or a gesture of the driver. If a detection device implemented in this manner detects and interprets that the driver is about to override a faulty actuator system, a cancellation or retraction of the actuator intervention based on a predictive model is performed. This yields a stable overall system with the automated vehicle while taking the driver reaction into account.

FIG. 6 shows a basic flow chart of one specific embodiment of the method of the present invention.

In a step 100, the system detects a driver intervention in a driving behavior of the vehicle in response to an intervention of at least one actuator triggered by the driver assistance system.

In a step 110, the system interprets the driver intervention as an override of the intervention of the actuator.

In a step 120, the system reduces in a defined manner the intervention of the actuator as a function of the interpretation of the driver intervention in such a way that a driving task is returned to the driver in a definably controlled manner.

Figure 5:
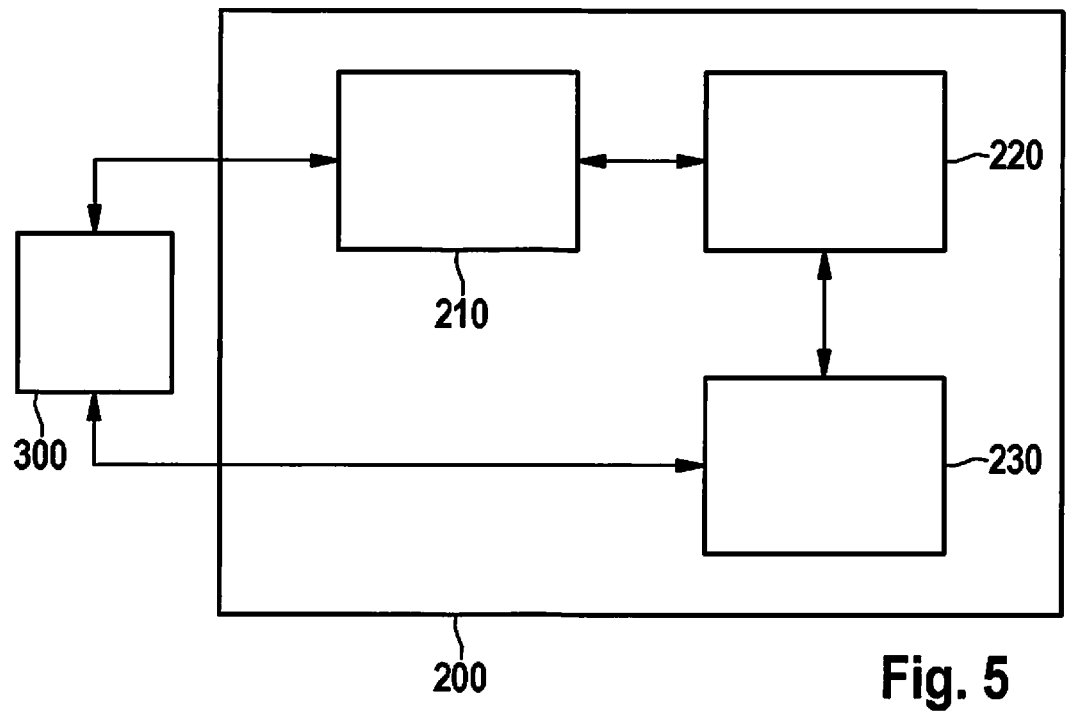
FIG. 5 a basic block diagram of a device for operating a vehicle having a driver assistance system intervening in a transverse dynamics of the vehicle.

FIG. 5 shows a block diagram of a specific embodiment of the provided device 200 for operating a vehicle having a driver assistance system intervening in a transverse dynamics of the vehicle.

The figure shows an actuator device 300 (e.g. brake, steering system, drive train, etc.) for performing a transverse-dynamic intervention in a driving operation of the vehicle.

Device 200 comprises a detection device 210 for detecting a driver intervention in a driving behavior of the vehicle due to an intervention of at least one actuator triggered by the driver assistance system. Detection device 210 is functionally connected to an interpretation device 220 for interpreting the driver intervention as an override of the intervention of the actuator. Interpretation device 220 is functionally connected to a reduction device 230 for definably reducing the intervention of the actuator as a function of the interpretation of the driver intervention, a control of the vehicle being thereby returned to the driver in a defined manner.

Advantageously, the provided method may be implemented by a software program running on device 200, which supports making the method easily adaptable.

One skilled in the art will suitably modify and/or combine with one another the features of the present invention without deviating from the essence of the present invention.

What is claimed is:

1. A method for operating a vehicle having a driver assistance system that intervenes in a transverse dynamics of the vehicle, comprising:
    detecting a driver intervention in a driving behavior of the vehicle due to an intervention of at least one actuator triggered by the driver assistance system;
    interpreting the driver intervention as an override of the intervention of the actuator; and
    reducing in a defined manner, the intervention of the actuator, as a function of the interpretation of the driver intervention, so as to return a driving task to the driver in a controlled and defined manner, wherein the defined reduction of the intervention of the actuator is performed on the basis of a predictive mathematical model, and wherein the predictive model takes into account a current state of the vehicle and a current state of the driver.

2. The method as recited in claim 1, wherein the intervention, triggered by the driver assistance system, of the at least one actuator influences a guidance of the vehicle and includes at least one of a braking intervention, a steering intervention, and an intervention in a drive train of the vehicle.

3. The method as recited in claim 1, wherein a time characteristic of the defined reduction of the intervention of the at least one actuator is designed in accordance with a defined mathematical function.

4. The method as recited in claim 1, wherein the detection of the driver intervention is performed by detecting a reaction of the driver of the vehicle.

5. The method as recited in claim 4, wherein the detection of the driver intervention is performed by at least one of detecting a driver activity on a steering wheel of the vehicle, detecting a steering-wheel angle, detecting a steering-wheel angular velocity, detecting a steering torque, detecting an operation of an accelerator pedal of the vehicle, detecting an operation of a brake pedal of the vehicle, and detecting at least one of a facial expression and a gesture of the driver.

6. The method as recited in claim 1, wherein the defined reduction of the intervention includes withdrawing the intervention of the actuator over a predetermined time period.

7. A device for operating a vehicle having a driver assistance system that intervenes in a transverse dynamics of the vehicle, comprising:
- a detection device for detecting a driver intervention in a driving behavior of the vehicle due to an intervention of at least one actuator triggered by the driver assistance system;
- an interpretation device for interpreting the driver intervention as an override of the intervention of the actuator; and
- a reduction device for definably reducing the intervention of the actuator, as a function of the interpretation of the driver intervention, so as to return a driving task to the driver in a definably controlled manner, wherein the defined reduction of the intervention of the actuator is performed on the basis of a predictive mathematical model, and wherein the predictive model takes into account a current state of the vehicle and a current state of the driver.

8. A non-transitory computer-readable data carrier on which is stored program code for operating a vehicle having a driver assistance system that intervenes in a transverse dynamics of the vehicle, the program code, when executed by a computer, causing the computer to perform the following steps:
- detecting a driver intervention in a driving behavior of the vehicle due to an intervention of at least one actuator triggered by the driver assistance system;
- interpreting the driver intervention as an override of the intervention of the actuator; and
- reducing in a defined manner, the intervention of the actuator, as a function of the interpretation of the driver intervention, so at to return a driving task to the driver in a controlled and defined manner, wherein the defined reduction of the intervention of the actuator is performed as a function of a predictive mathematical model, and wherein the predictive mathematical model takes into account a current state of the vehicle and a current state of the driver, and wherein the predictive model takes into account a current state of the vehicle and a current state of the driver.

* * * * *